US009769111B1

(12) United States Patent
Shani (10) Patent No.: US 9,769,111 B1
(45) Date of Patent: Sep. 19, 2017

(54) SYSTEM, METHOD, AND COMPUTER PROGRAM FOR MANY-TO-ONE COMMUNICATIONS IN A NETWORK

(71) Applicant: Amdocs Software Systems Limited, Dublin (IE)

(72) Inventor: Omer Shani, Savyon (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 241 days.

(21) Appl. No.: 14/184,634

(22) Filed: Feb. 19, 2014

Related U.S. Application Data

(60) Provisional application No. 61/816,750, filed on Apr. 28, 2013.

(51) Int. Cl.
*G06F 15/16* (2006.01)
*H04L 29/12* (2006.01)

(52) U.S. Cl.
CPC .................................. *H04L 61/20* (2013.01)

(58) Field of Classification Search
USPC ........................................ 709/245, 206, 217
See application file for complete search history.

(56) References Cited

U.S. PATENT DOCUMENTS

| 8,601,162 | B1* | 12/2013 | O'Shaughnessy | ...... H04L 67/06 709/200 |
| 8,893,254 | B1* | 11/2014 | Khanfar | ............. H04L 63/0281 709/240 |
| 2005/0165914 | A1* | 7/2005 | Moore | ................... H04L 29/06 709/219 |
| 2012/0036161 | A1* | 2/2012 | Lacapra | ............ G06F 17/30194 707/781 |

* cited by examiner

*Primary Examiner* — El Hadji Sall
(74) *Attorney, Agent, or Firm* — Zilka-Kotab, PC (57) ABSTRACT

A system, method, and computer program product are provided for many-to-one communications in a network. In use, a first single device subscribes to receive communication from a first network address associated therewith, the first network address being an address other than a network address of the first single device. Further, a plurality of devices communicate information to the first network address associated with the first single device. Responsive to communicating the information by the plurality of devices to the first network address, the information is forwarded to the first single device.

16 Claims, 8 Drawing Sheets

SYSTEM, METHOD, AND COMPUTER PROGRAM FOR MANY-TO-ONE COMMUNICATIONS IN A NETWORK

CLAIM OF PRIORITY

This application claims the benefit of U.S. Provisional Application No. 61/816,750, filed Apr. 28, 2013, the entire contents of which are incorporated herein by reference.

FIELD OF THE INVENTION

The present invention relates to computer networks, and more particularly to communicating in such networks.

BACKGROUND

When a large number of processes need to send information to a small number of processes, or even to a single collector, standard communication procedures call for the establishment of either a connection between all the sending processes to the collector, or to at least open a unicast address between each of the senders and the collector. This typically causes an unnecessarily complex communications scheme on both the sender and the receiver sides. The number of connections, or unicast channels, is N (number of senders)×M (number of receivers).

Creating a high availability model for such an M×N communication model is complex, and typically requires significant monitoring, since the unicast addresses are not anonymous and any change in the location of the receiving process must be known to the sending processes, preferably in advance.

There is thus a need for addressing these and/or other issues associated with the prior art.

SUMMARY

A system, method, and computer program product are provided for many-to-one communications in a network. In use, a first single device subscribes to receive communication from a first network address associated therewith, the first network address being an address other than a network address of the first single device. Further, a plurality of devices communicate information to the first network address associated with the first single device. Responsive to communicating the information by the plurality of devices to the first network address, the information is forwarded to the first single device.

DETAILED DESCRIPTION

Figure 1:
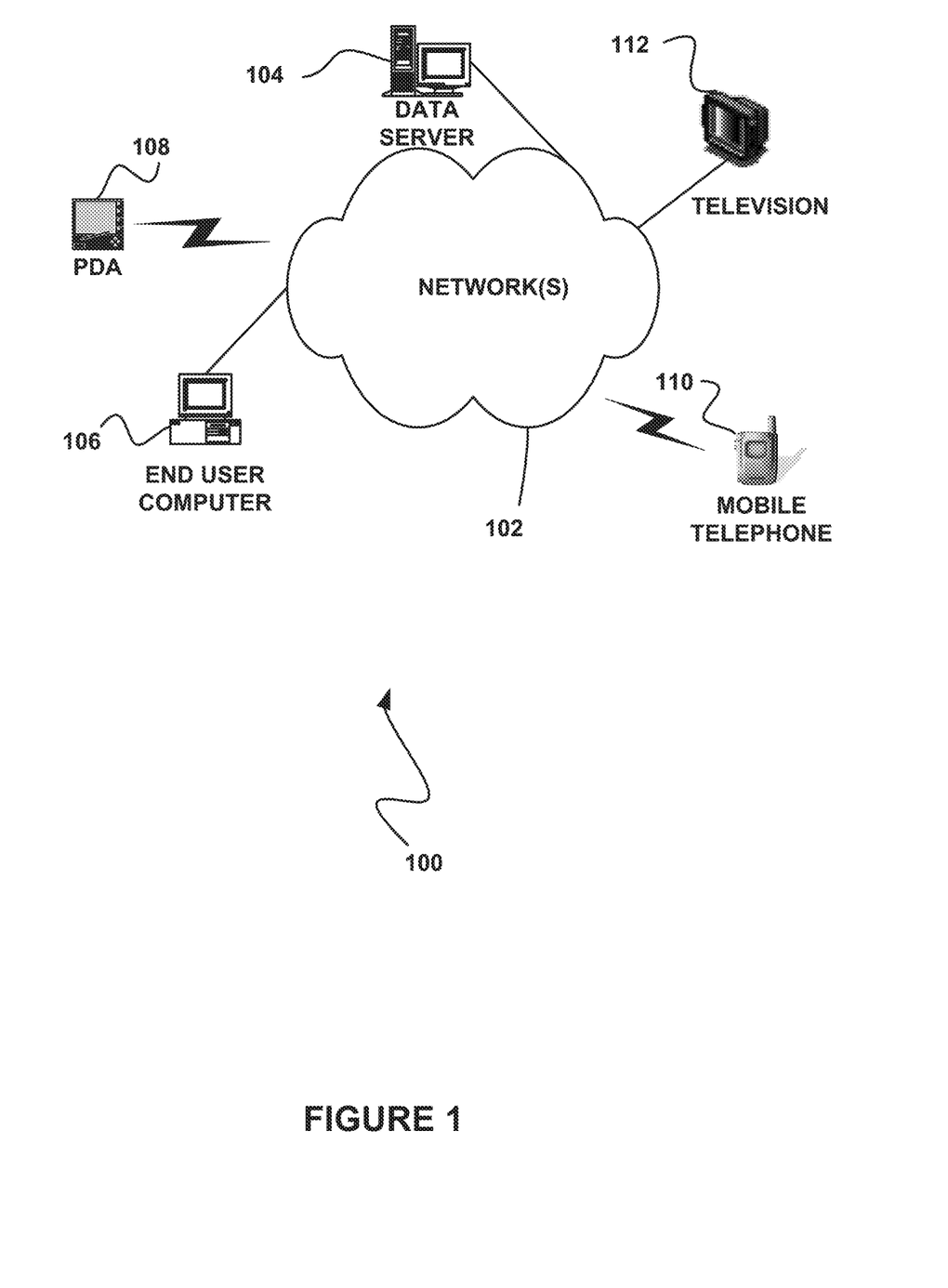
FIG. 1 illustrates a network architecture, in accordance with one possible embodiment.

FIG. 1 illustrates a network architecture 100, in accordance with one possible embodiment. As shown, at least one network. 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
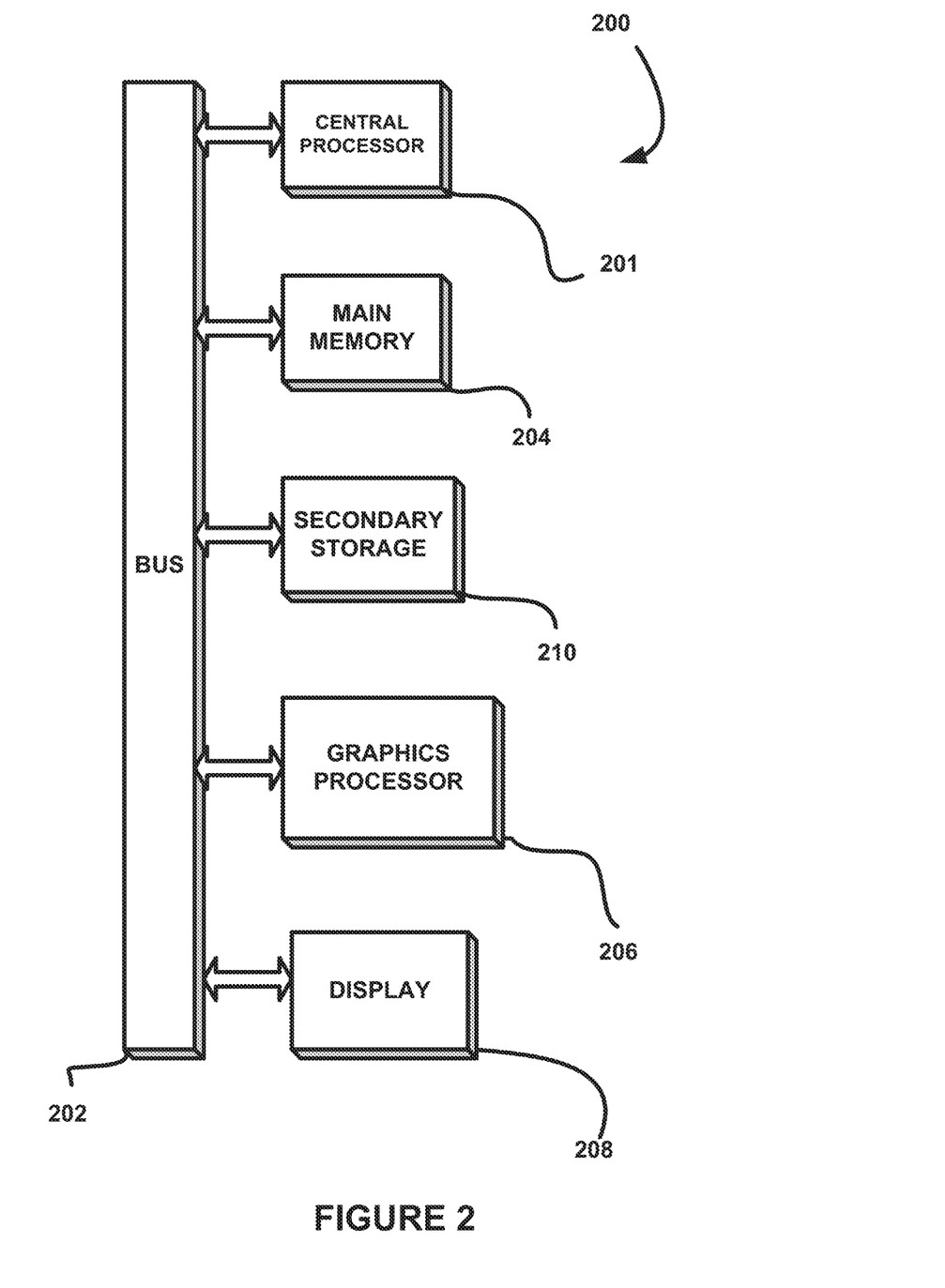
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
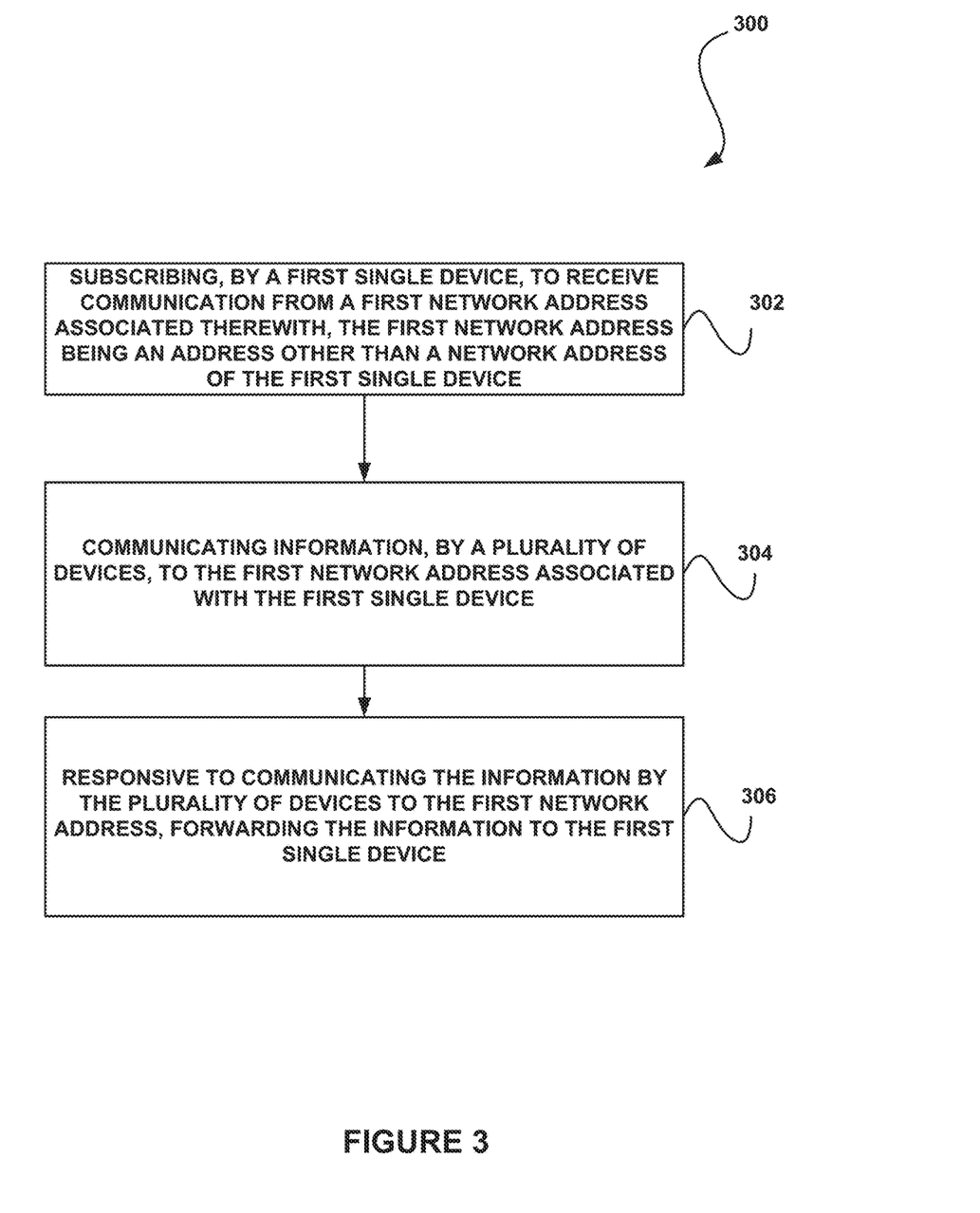
FIG. 3 illustrates a method for many-to-one communications in a network, in accordance with one embodiment.

FIG. 3 illustrates a method 300 for many-to-one communications in a network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first single device subscribes to receive communication from a first network address associated therewith, the first network address being an address other than a network address of the first single device. See operation 302. The network may include any type of network. For example, in one embodiment, the network may include a computer network. In another embodiment, the network may include a network associated with a telecommunications system.

Additionally, the single device may include any type of device capable of receiving communications in a network. For example, in one embodiment, the device may include a computer. In another embodiment, the device may include a mobile device.

Further, in one embodiment, the address from which the first single device subscribes to receive communication may include a multicast address. Of course, such address may include any address in which devices may send communications.

As shown further in FIG. 3, a plurality of devices communicate information to the first network address associated with the first single device. See operation 304. The plurality of devices may include any type of device capable of communicating in a network.

For example, in one embodiment, the plurality of devices may include a computer. In another embodiment, the plurality of devices may include a mobile device. The plurality of devices may be provided with the first network address associated with the first single device.

In one embodiment, the first network address may replace a unicast address associated with the plurality of devices. In another embodiment, the first network address may replace a TCP connection associated with the plurality of devices. Further, in one embodiment, the information may be formatted as a multicast message.

Responsive to communicating the information by the plurality of devices to the first network address, the information is forwarded to the first single device. See operation 306. Thus, the method 300 may function to implement an anonymous sending schema, where multiple senders may send information to a single recipient, which may optionally be the only subscriber for this address. In this way, no complex mapping of a unicast addresses is required, and the recipient process can be located anywhere within the network.

Accordingly, in one embodiment, the first single device may be anonymous with respect to the plurality of devices. Additionally, the plurality of devices may be anonymous with respect to the first single device.

The first device need not necessarily be the only receiver/collector. For example, in one embodiment, an indication may be received, indicating that communicating the information to the first network address associated with the first single device was unsuccessful. In this case, in one embodiment, a second network address associated with a second single device may be automatically established, where the second network address is an address other than the network address of the first single device, a network address of the second single device, and the first network address.

The second single device may further subscribe to receive communication from the second network address associated therewith. Additionally, the plurality of devices may communicate the information to the second network address associated with the second single device. Responsive to communicating the information by the plurality of devices to the second network address, the information may be forwarded to the second single device.

In one embodiment, the method 300 may further include subscribing, by the second single device, to receive communication from a second network address associated therewith, where the second network address is an address other than the network address of the first single device, a network address of the second single device, and the first network address.

In this case, it may be determined whether to communicate the information, by the plurality of devices, to the second network address associated with the second single device. Responsive to communicating the information by the plurality of devices to the second network address, the information may be forwarded to the second single device.

In another embodiment, it may be determined whether to communicate the information, by the plurality of devices, to the second network address associated with the second single device or the first network address associated with the first single device. In this case, determining whether to communicate the information, by the plurality of devices, to the second network address associated with the second single device or the first network address associated with the first single device may be based on the information (e.g. ownership of the information, the size of the information, etc.)

As an option, a quorum component may be utilized to determine whether to communicate the information, by the plurality of devices, to the second network address associated with the second single device or the first network address associated with the first single device, based on the information.

In yet another embodiment, determining whether to communicate the information, by the plurality of devices, to the second network address associated with the second single device or the first network address associated with the first single device may be based on a primary receiver dedication. For example, the first device may be dedicated as the primary receiver and the second device may be dedicated an auxiliary receiver. In this case, the information may be sent to the address associated with the first device initially (e.g. unless there is a failure, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
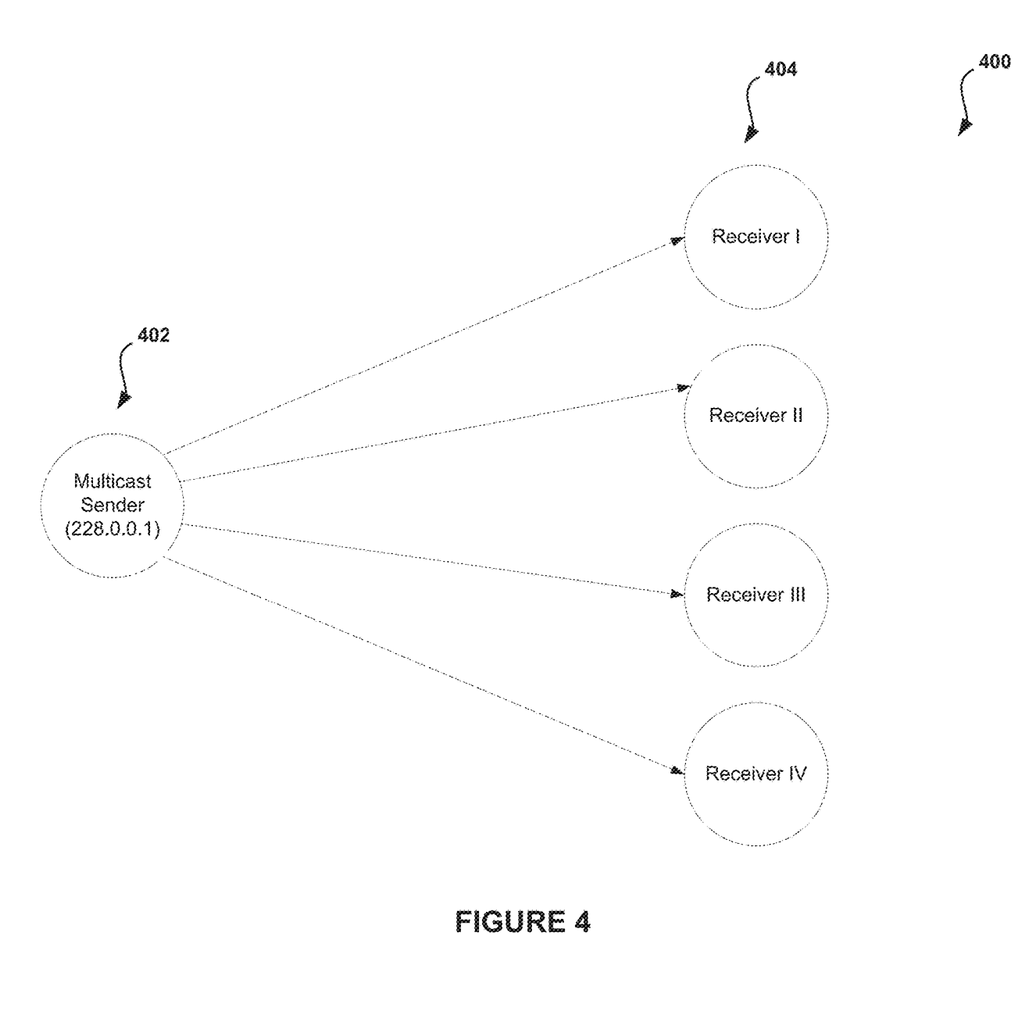
FIG. 4 illustrates a multicast scheme, in accordance with one example.

FIG. 4 illustrates a multicast scheme 400, in accordance with one example. As an option, the multicast scheme 400 may be viewed in the context of the details of FIGS. 1-3. Of course, however, the multicast scheme 400 may be viewed in the context of the details of any desired environment. Further, the aforementioned definitions may equally apply to the description below.

FIG. 4 shows a multicast scheme, where a single process publishes its messages, and subscribing processes collect this information. Multicast communication is typically used when a sender 402 does not have to be aware of the identity of receiving partners 404, thereby being anonymous. In some multicast environments, messages are published by a sender, and whichever process subscribes to that address receives the messages.

When a large number of processes need to send information to a few collector processes, or even to a single collector, standard communication procedures call for the establishment of either a connection between all the sending processes to the collector, or to at least open a unicast address between each of the senders and the collector. When sending a unicast message, the sending process needs to know where to send the information, and the identity of the receiving process, or at least its location, should be available to it. This 'need to know' creates an unnecessarily complex communication scheme on both the sender and the receiver sides.

Creating a high availability scheme of primary and alternate collectors typically requires the sender to send the information twice, or to have a complex signaling method to determine where to send the messages, since the address of the message changes according to the target.

Figure 5:
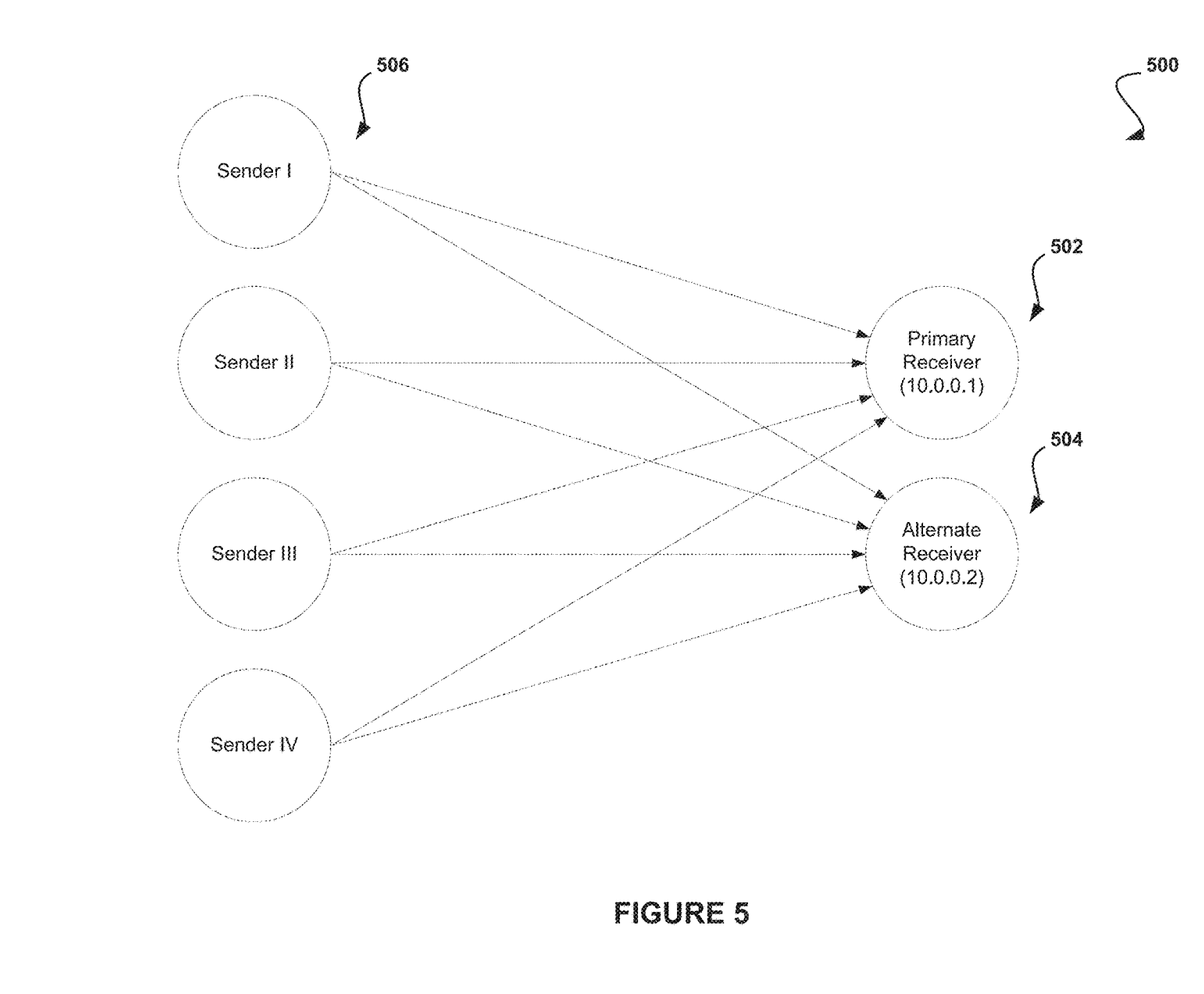
FIG. 5 illustrates a unicast to primary scheme with alternate collectors, in accordance with one example.

FIG. 5 illustrates a unicast to primary scheme 500 with alternate collectors, in accordance with one example. As an option, the unicast to primary scheme 500 may be viewed in the context of the details of FIGS. 1-4. Of course, however, the unicast to primary scheme 500 may be may be viewed in the context of the details of any desired environment. Further, the aforementioned definitions may equally apply to the description below.

As shown, FIG. 5 depicts a primary collector 502 and an alternate collector 504, which require a sender 506 to send the information twice, or to have a complex signaling method to determine where to send the messages, since the address of the message changes according to the target.

In one embodiment, a reverse multicast implementation may be utilized to take the multicast paradigm and reverse the anonymity and the role. When using standard multicast, a recipient subscribes to receive communication from an address which is associated with the sender of the information.

Contrarily, when using a reverse multicast technique, the multiple senders of information communicate with a multicast address which is associated with the recipient. This reversal enables a many-to-one transmission that still uses the anonymity and the decoupling offered by the multicast principle. No complex mapping of the unicast addresses is required, and the recipient process can be located anywhere within the network. This reverse multicast technique is shown in FIG. 6.

Figure 6:
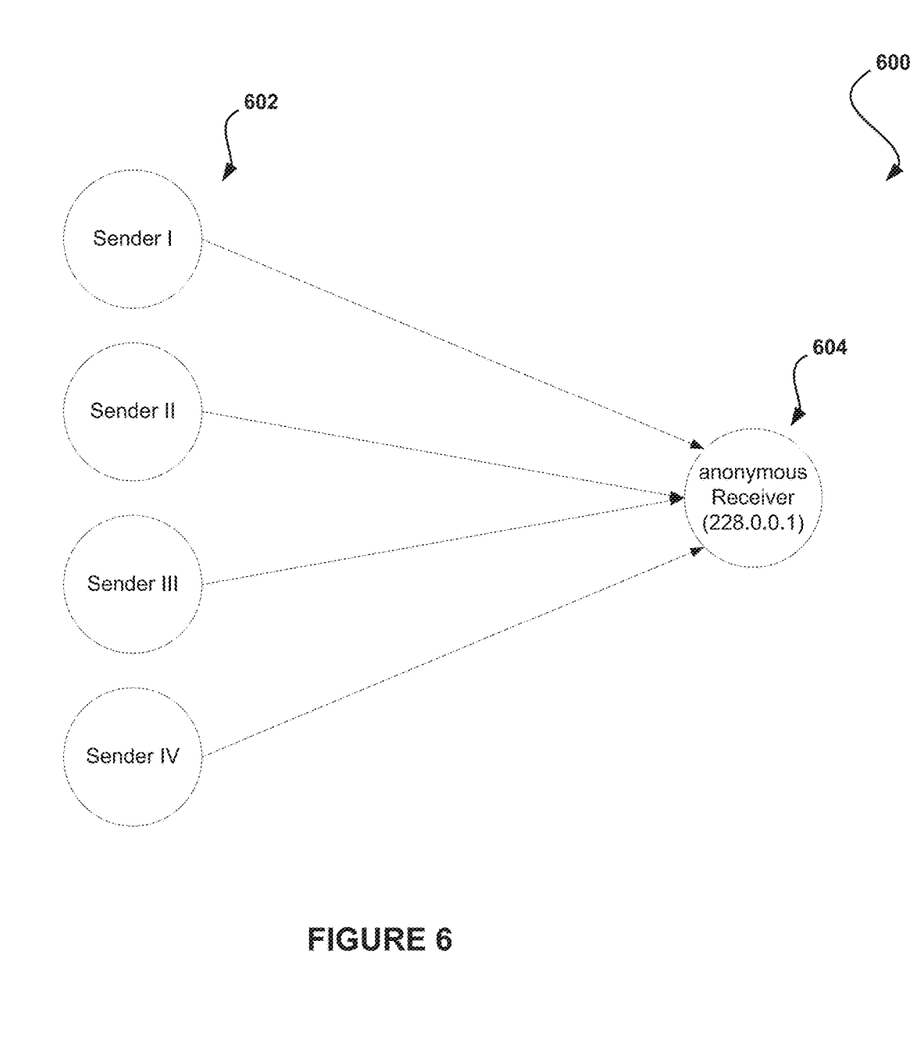
FIG. 6 illustrates a reverse multicast scheme for many-to-one communications in a network, in accordance with one embodiment.

FIG. 6 illustrates a reverse multicast scheme 600 for many-to-one communications in a network, in accordance with one embodiment. As an option, the reverse multicast scheme 600 may be implemented in the context of the details of FIGS. 1-5. Of course, however, the reverse multicast scheme 600 may be implemented in the context of any desired environment. Further, the aforementioned definitions may equally apply to the description below.

As shown, multiple senders 602 of information communicate with a multicast address 604, which is associated with a recipient. This communication enables a many-to-one transmission that still uses the anonymity and decoupling offered by a multicast principle. Creating a high availability scheme comprising a primary and alternate collector while using reverse multicast becomes identical to the definition of a single collector.

Figure 7:
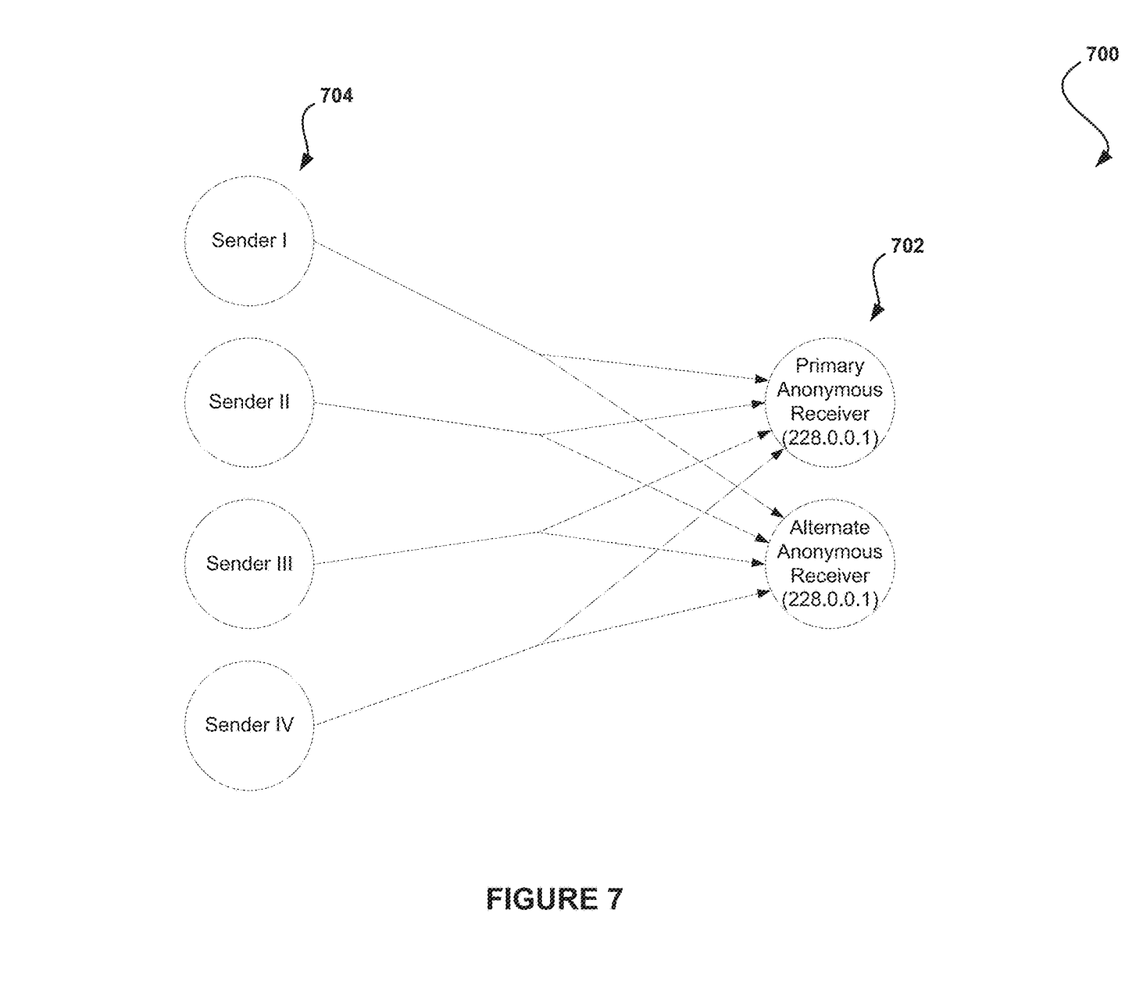
FIG. 7 illustrates a reverse multicast scheme for many-to-one communications in a network, in accordance with one embodiment.

FIG. 7 illustrates a reverse multicast scheme 700 for many-to-one communications in a network, in accordance with one embodiment. As an option, the reverse multicast scheme 700 may be implemented in the context of the details of FIGS. 1-6. Of course, however, the reverse multicast scheme 700 may be implemented in the context of any desired environment. Further, the aforementioned definitions may equally apply to the description below.

As shown, two collectors 702 (e.g. a primary and alternate, etc.) subscribe to the same multicast address, and receive the same message, without the awareness of the sending process. From a sender's 704 view point, the sender 704 is still sending a single message, the entire high-availability schema is actually transparent to it, and does not require any additional configuration, nor does it require any signaling and maintenance for adding, removing, or changing collectors.

In one embodiment, after the failure of one collector, a new receiver may be added immediately (e.g. automatically) to the system, and high availability may be maintained. Their location in the system may be arbitrary, and the sender does not need to have any knowledge of them.

Figure 8:
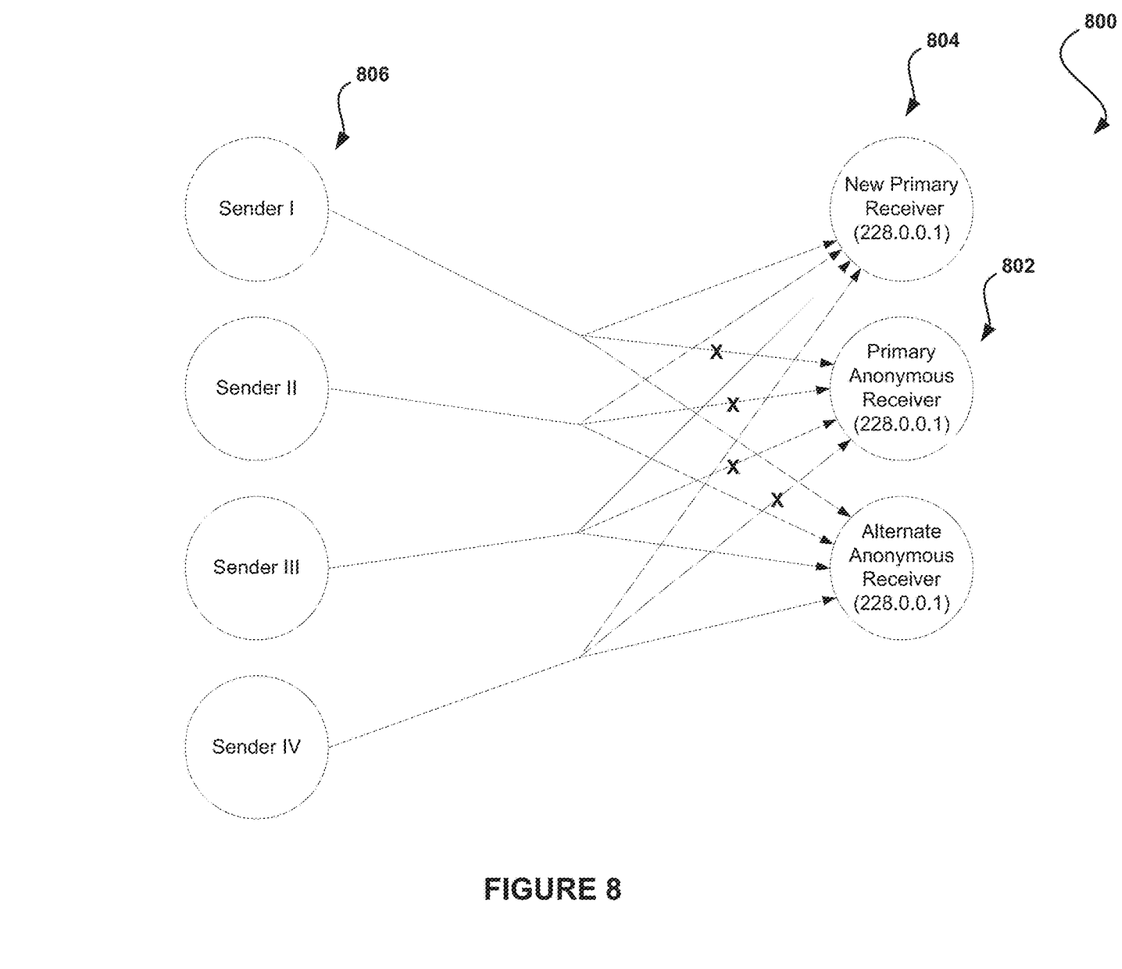
FIG. 8 illustrates a reverse multicast scheme for many-to-one communications in a network, in accordance with one embodiment.

FIG. 8 illustrates a reverse multicast scheme 800 for many-to-one communications in a network, in accordance with one embodiment. As an option, the reverse multicast scheme 800 may be implemented in the context of the details of FIGS. 1-7. Of course, however, the reverse multicast scheme 800 may be implemented in the context of any desired environment. Further, the aforementioned definitions may equally apply to the description below.

As shown in FIG. 8, after the failure of a first primary collector 802, a new collector 804 may be added immediately (e.g. automatically) to the system. The location of the new collector 804 in the system may be arbitrary, and senders 806 do not need to have any knowledge of them.

If the system requires that only one of the collectors process the received data, then, in one embodiment, a quorum mechanism may be utilized to decide which of the collectors should process the information received (e.g. based on an ownership table in a database, or an amount of a disc space available, etc,).

In one embodiment, in order to implement reverse multicast, the senders may be provided with a multicast address that may be used by the receiver. This address may replace a TCP connection or a unicast address. Additionally, the receiver(s) may subscribe to the multicast address, in order to receive the data. In this case, a sending and receiving algorithm may remain the same.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving, by a system from a first network device, a subscription to a first network address, the first network address being an address other than a network address of the first network device;
   computer code for identifying, by the system, information communicated to the first network address by a plurality of second network devices; and
   computer code for forwarding, by the system, the information from the first network address to the first network device, after receiving the subscription and responsive to identifying the information;
   wherein the first network device subscribes to the first network address in order to receive the information from the first network address anonymously with respect to the plurality of second network devices.

2. The computer program product of claim 1, wherein the computer program product is operable such that the first network device is anonymous with respect to the plurality of second network devices.

3. The computer program product of claim 1, wherein the computer program product is operable such that the plurality of second network devices are anonymous with respect to the first network device.

4. The computer program product of claim 1, further comprising computer code for receiving an indication that communicating additional information by the plurality of second network devices to the first network address subscribed to by the first single device was unsuccessful.

5. The computer program product of claim 4, further comprising computer code for automatically establishing a second network address associated with a third network device, the second network address being an address other than each of the network address of the first network device, a network address of the third network device, and the first network address.

6. The computer program product of claim 5, further comprising computer code for subscribing, by the third network device, to the second network address.

7. The computer program product of claim 6, further comprising computer code for communicating the additional information, by the plurality of second devices, to the second network address.

8. The computer program product of claim 7, further comprising computer code for, responsive to communicating the additional information by the plurality of second devices to the second network address, forwarding the additional information to the third network device.

9. The computer program product of claim 1, further comprising computer code for providing the plurality of second devices with the first network address.

10. The computer program product of claim 9, wherein the computer program product is operable such that the first network address replaces a unicast address associated with the plurality of second devices.

11. The computer program product of claim 1, wherein the computer program product is operable such that the information is formatted as a multicast message.

12. A method, comprising:
  receiving, by a system from a first network device, a subscription to a first network address, the first network address being an address other than a network address of the first network device;
  identifying, by the system, information communicated to the first network address by a plurality of second network devices; and
  forwarding, by the system, the information from the first network address to the first network device, after receiving the subscription and responsive to identifying the information;
  wherein the first network device subscribes to the first network address in order to receive the information from the first network address anonymously with respect to the plurality of second network devices.

13. A system comprising:
  a memory system; and
  one or more processing cores coupled to the memory system and that are each configured to:
    receive, by a system from a first network device, a subscription to a first network address, the first network address being an address other than a network address of the first network device;
    identify, by the system, information communicated to the first network address by a plurality of second network devices; and
    forward, by the system, the information from the first network address to the first network device, after receiving the subscription and responsive to identifying the information;
    wherein the first network device subscribes to the first network address in order to receive the information from the first network address anonymously with respect to the plurality of second network devices.

14. The computer program product of claim 1, wherein the plurality of second network devices select between the first network address and a second network address associated with a third network device for communicating the information thereto.

15. The computer program product of claim 14, wherein the information is communicated to the first network address by the plurality of second network devices when the plurality of second network devices select the first network address for communicating the information thereto.

16. The computer program product of claim 14, wherein a quorum component is utilized by the plurality of second network devices to select between the first network address and the second network address.

* * * * *